2 Sheets—Sheet 1.
T. OLSEN.
Testing-Machine.
No. 212,734. Patented Feb. 25, 1879.
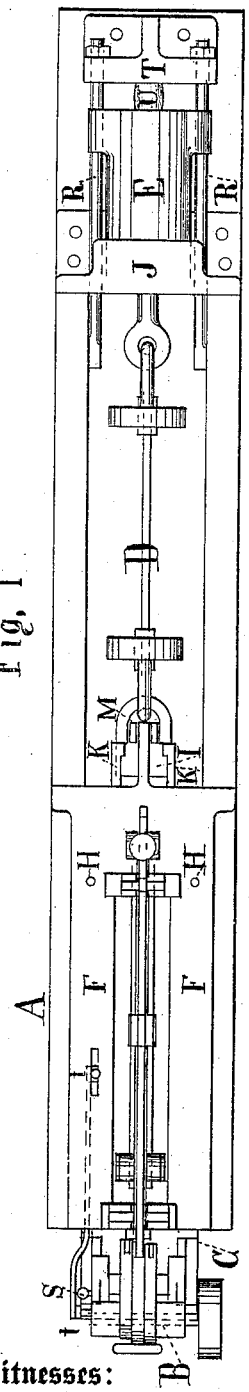
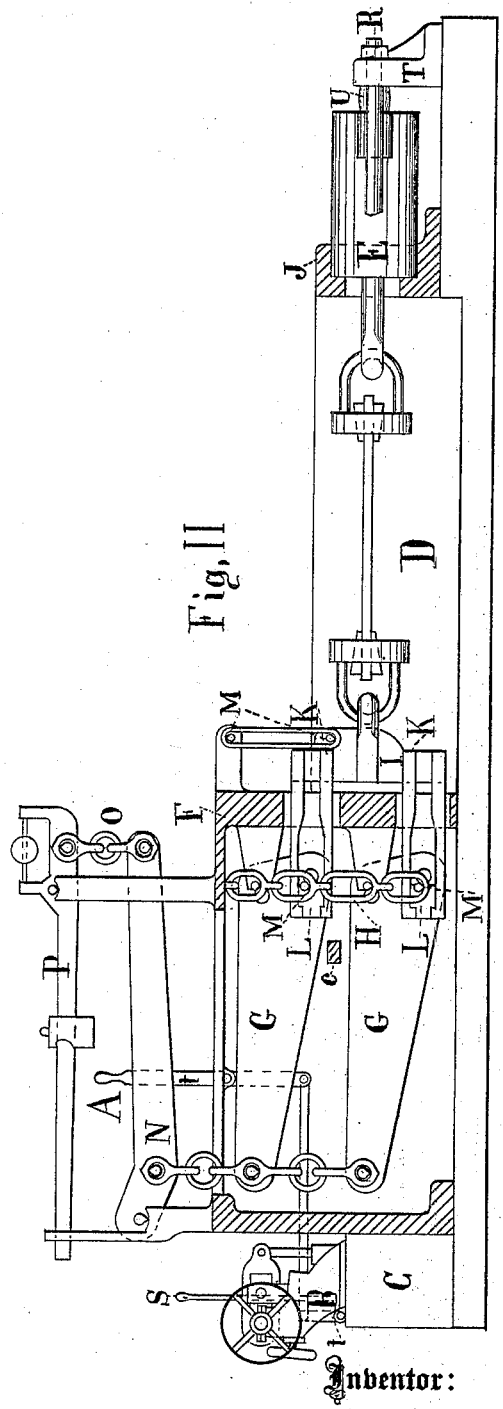
Witnesses:
J. N. De Haven,
Chas. Robson
Inventor:
Tinius Olsen

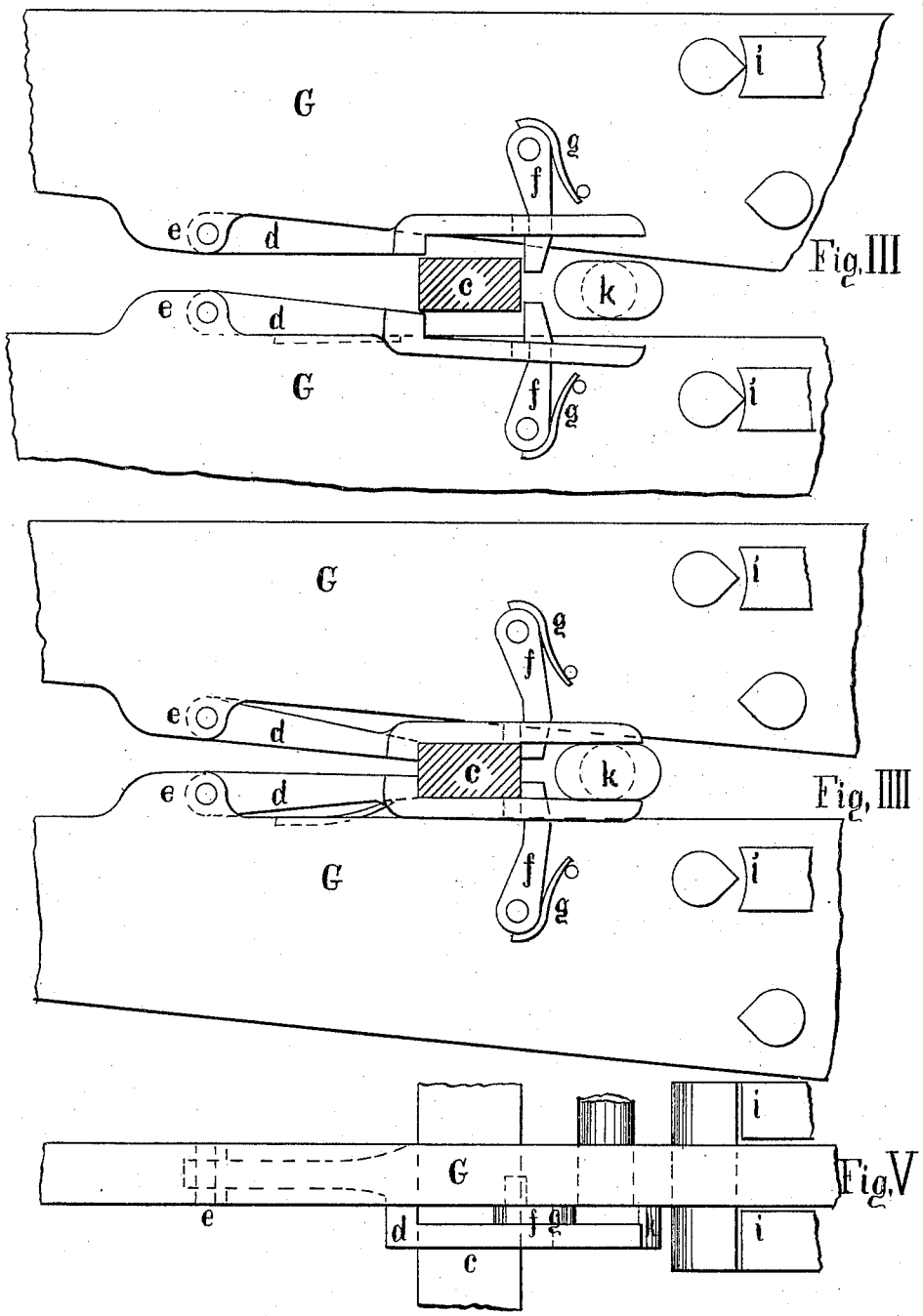

UNITED STATES PATENT OFFICE.

TINIUS OLSEN, OF PHILADELPHIA, PENNSYLVANIA.

IMPROVEMENT IN TESTING-MACHINES.

Specification forming part of Letters Patent No. 212,734, dated February 25, 1879; application filed September 20, 1878.

*To all whom it may concern:*

Be it known that I, TINIUS OLSEN, of Philadelphia, county of Philadelphia, and State of Pennsylvania, have invented new and useful Improvements in Machines for Testing the Strength of Materials, of which the following is a specification:

Heretofore horizontal testing-machines have been made with only one main lever. This main lever requires a certain length of knife-edge in proportion to the amount of strain it is required to transmit from the power to the weighing-beam. In large machines a single lever of this kind is necessarily very large, and consequently requires the frame-work which incloses it to be of too great dimensions in proportion to the capacity of the machine, and my improvement, as referred to below, secures the advantage of a more compact weighing arrangement.

No provision has heretofore been made in these machines to prevent the injury resulting from the jar which must necessarily follow the breaking of a specimen being tested, especially at a high strain, in which case the blow resulting from the recoil of the heavy suspended main lever will destroy the knife-edges and contiguous bearing-surfaces.

I would describe my invention as applied to what is known as a "horizontal testing-machine," being applicable to any other arrangements of same, or for other purposes specified more clearly in the following.

In the accompanying drawings similar letters of reference indicate like parts in all figures.

Figure I represents a plan, and Fig. II a side, view of the weighing end A, pump B, reservoir C, trough D, and jack E of a horizontal testing-machine.

The frame of weighing end is shown in section, so as to more clearly represent the working parts.

The main frame F of weighing end A incloses the main levers G, which are represented as one pair, one above another. In large machines two such pairs can be used, one alongside of the other, arranged and suspended as shown in the drawings. Instead of suspension-links H, movable supports from below can be substituted.

The strain upon the specimen to be weighed is communicated to the main lever G through tools and cross-head I and straps or bars K, which are attached to steel bearings L, resting against the knife-edges of the levers G. The cross-head I and steel bearings L are also suspended upon knife-edges and links with steel bearings, as shown at M, thereby securing a perfect free motion horizontally.

From the small end of the main lever the strain is communicated through clevises and links to the intermediate lever, N, one end of which is supported on the frame-work, and the other end connected at O to the weighing-beam P. The latter is provided with movable weights and divisions similar to an ordinary scale-beam, so that the strain transmitted through the system of levers can be balanced and indicated.

The main levers G, being of necessity very heavy and suspended and free in their motion, will recoil more or less when a very heavy strain is suddenly released, as in the breaking of a specimen under high tension, and the returning blow will injure the steel knife-edges and bearing-surfaces; and in order to prevent any damage the device is introduced as shown in detail in Figs. III, IIII, and V, being two side views and the plan, respectively. G, the main levers; c, a bar or part of the frame-work of the machine; d, levers or pawls attached to levers G at e as a hinged joint. The other end of the pawls is held in position by the small pawls f, pressed against the end of pawls d by springs g. By the recoil of the main levers G the pawls f are thrown back, and the pawls d will, by suitable springs or by gravity, assume the positions shown in Fig. IIII— viz., the levers G slightly removed from the steel bearing-surfaces in the frame-work at i.

To restore the levers G to the proper position required in act of weighing, as shown in Fig. III, an arrangement consisting of a cam, k, fitted with shaft and crank or some similar contrivance, can be used.

The strain on the specimen being tested in this machine is produced by the hydraulic jack E, placed in a convenient locality, usually at the extreme end of the apparatus, as shown in Figs. I and II.

The jack E is worked by a three-plunger pump, B, placed at the end of the frame F, as shown in Figs. I and II, supported on its reservoir C for fluid, and worked either by hand or power, as may be required. The handles S and t, which are in connection with the arrangement of the pumps for reversing or stopping the flow of fluid to the jack, are placed conveniently for the operator when in the act of using the weighing-beam.

The jack E is not bolted to the frame-work, but fits into a sleeve and cross-head, J, at the end of the trough D, (see Figs. I and II,) and the other end is supported on the two bolts R. One end of bolts R is secured to sides of trough D, and the other ends receive a cross-head, T, which is bolted to the foundation.

Between the jack E and the cross-head T is inserted a rubber cushion, U. By this arrangement the cushion U takes up the concussion of the recoil of the jack produced by the breaking of a specimen and expansion of trough, thus avoiding any excessive jar to the machine and its parts.

The operation of the machine will be as follows: First start the pump; next set the jack by the handles S and t in proper connection with pump, so that the plunger will move toward the weighing end. When in proper position the plunger in jack is stopped. One end of the specimen to be tested is secured with suitable tools to the plunger, the other end being held in the tools secured to the weighing end of the machine. This accomplished, the proper connections between the jack and pump is made with handle S and t, so that the plunger of jack will move in a contrary direction and exert the strain upon the specimen. This strain is transmitted, as before mentioned, through the main and intermediate levers, to the beam P, and causes the same to rise. The operator will then, by means of the poises, keep the weighing-beam P in equilibrium, and continue doing so until the specimen is tested sufficiently.

What I claim is—

1. The pair or pairs of levers G, in combination with the cross-head I, bars K, steel bearings L, and suspended links H, arranged as and for the purposes herein specified.

2. The combination of pawls or levers $d$, pawls $f$, springs $g$, and cam $k$, as set forth.

3. The combination of jack E, cross-head J, bolts R, cross-head T, and cushion U, arranged as and for the purpose herein specified.

4. The combination and arrangement, in a testing-machine, as represented in Figs. I and II, of a weighing end, A, jack E, pump B, handle S, and handle $t$, substantially as described.

TINIUS OLSEN.

Witnesses:
I. N. DE HAVEN,
CHAS. ROBSON.